US012596890B2

(12) United States Patent
Tu et al.

(10) Patent No.: US 12,596,890 B2
(45) Date of Patent: Apr. 7, 2026

(54) SYSTEMS AND METHODS FOR CROSS-LINGUAL TRANSFER LEARNING

(71) Applicant: Salesforce, Inc., San Francisco, CA (US)

(72) Inventors: Lifu Tu, San Francisco, CA (US); Yingbo Zhou, Palo Alto, CA (US); Caiming Xiong, Menlo Park, CA (US); Jin Qu, San Mateo, CA (US)

(73) Assignee: Salesforce, Inc., San Francisco, CA (US)

( * ) Notice: Subject to any disclaimer, the term of this patent is extended or adjusted under 35 U.S.C. 154(b) by 286 days.

(21) Appl. No.: 18/309,330

(22) Filed: Apr. 28, 2023

(65) Prior Publication Data

US 2024/0330603 A1 Oct. 3, 2024

Related U.S. Application Data

(60) Provisional application No. 63/493,166, filed on Mar. 30, 2023.

(51) Int. Cl.
*G06F 40/47* (2020.01)
*G06F 40/284* (2020.01)
*G06F 40/30* (2020.01)
*G06F 40/51* (2020.01)

(52) U.S. Cl.
CPC ............ *G06F 40/47* (2020.01); *G06F 40/284* (2020.01); *G06F 40/30* (2020.01); *G06F 40/51* (2020.01)

(58) Field of Classification Search
CPC ........ G06F 40/47; G06F 40/284; G06F 40/30; G06F 40/51; G06F 40/35
See application file for complete search history.

(56) References Cited

U.S. PATENT DOCUMENTS

| | | | | |
|---|---|---|---|---|
| 2004/0068406 A1* | 4/2004 | Maekawa | ............ | H04N 21/488 |
| | | | | 704/E15.04 |
| 2023/0100376 A1* | 3/2023 | Liu | ......................... | G06F 40/30 |
| | | | | 704/9 |
| 2023/0237826 A1* | 7/2023 | Perez | .................... | G06N 3/0475 |
| 2024/0020538 A1* | 1/2024 | Socher | ................... | G06N 3/084 |
| 2024/0062014 A1* | 2/2024 | Sreedhar | ................ | G06F 40/35 |
| 2024/0256796 A1* | 8/2024 | Hyland | ................... | H04L 51/02 |
| 2024/0273294 A1* | 8/2024 | Shakeri | ................ | G06F 40/295 |
| 2025/0061888 A1* | 2/2025 | Dong | ..................... | G10L 21/00 |

OTHER PUBLICATIONS

Lester et al. "The Power of Scale for Parameter-Efficient Prompt Tuning" bearXiv:2104.08691v2 [cs.CL] Sep. 2, 2021 (Year: 2021).*

(Continued)

*Primary Examiner* — Darioush Agahi

(74) *Attorney, Agent, or Firm* — Haynes and Boone, LLP

(57) ABSTRACT

Embodiments described herein provide a method of training a language model by tuning a prompt. The method comprises masking tokens of first and second conversational texts which have the same semantic meaning but in different languages (e.g., a translation). The masked texts are input to a language model with a prepended soft prompt. The language model generates respective predicted outputs. A loss objective is computed including a masked language model loss. The prompt is updated based on the computed loss objective via backpropagation while keeping the language model frozen.

17 Claims, 13 Drawing Sheets

(56)        References Cited

OTHER PUBLICATIONS

Junjie Hu, Sebastian Ruder, Aditya Siddhant, Graham Neubig, Orhan Firat, and Melvin Johnson. 2020. Xtreme: A massively multilingual multitask benchmark for evaluating cross-lingual generalisation. In Proceedings of the 37th International Conference on Machine Learning, vol. 119 of Proceedings of Machine Learning Research, pp. 4411-4421. PMLR.

Lifu Tu, Caiming Xiong, and Yingbo Zhou. 2022. Prompt-tuning can be much better than fine-tuning on cross-lingual understanding with multilingual language models. In Findings of the Association for Computational Linguistics: EMNLP 2022, pp. 5478-5485, Abu Dhabi, United Arab Emirates. Association for Computational Linguistics.

* cited by examiner

400

Server 430

Cross-Lingual Language Module 330

Database 432

Network Interface 433

Data Vendor Server 445

Database 419

Network Interface 426

Network 460

Data Vendor Server 480

Data Vendor Server 470

User Device 410

UI Application 412

Other Applications 416

Database 418

Network Interface 417

440

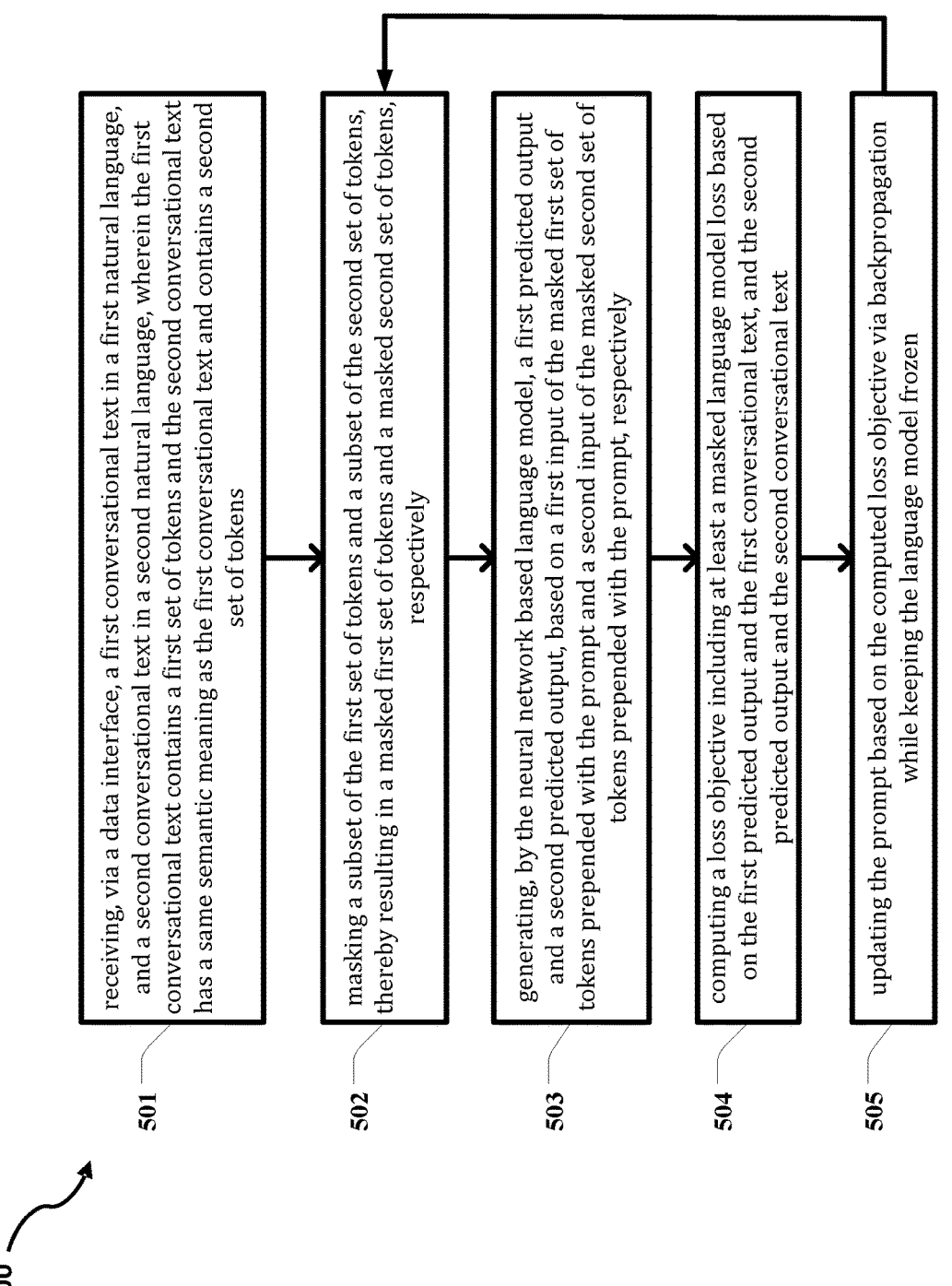

500

501  receiving, via a data interface, a first conversational text in a first natural language, and a second conversational text in a second natural language, wherein the first conversational text contains a first set of tokens and the second conversational text has a same semantic meaning as the first conversational text and contains a second set of tokens 502  masking a subset of the first set of tokens and a subset of the second set of tokens, thereby resulting in a masked first set of tokens and a masked second set of tokens, respectively 503  generating, by the neural network based language model, a first predicted output and a second predicted output, based on a first input of the masked first set of tokens prepended with the prompt and a second input of the masked second set of tokens prepended with the prompt, respectively 504  computing a loss objective including at least a masked language model loss based on the first predicted output and the first conversational text, and the second predicted output and the second conversational text 505  updating the prompt based on the computed loss objective via backpropagation while keeping the language model frozen

| | non-conversation | conversation |
|---|---|---|
| 5-shots | 51.7 (1.1) | 55.2 (1.3) |
| 15-shots | 63.0 (0.5) | 66.5 (0.5) |
| all-shots | 76.1 (0.6) | 77.7 (0.5) |

FIG. 7

| | en | hi | ms | vi | gd | tg | AVG |
|---|---|---|---|---|---|---|---|
| Fine Tuning | | | | | | | |
| | 95.7 | 92.8 | 93.2 | 93.9 | 84.5 | 75.0 | 88.6 |
| Prompt Tuning | | | | | | | |
| l = 4 | 93.6 | 90.8 | 90.7 | 90.5 | 83.7 | 74.5 | 87.5 |
| l = 8 | 96.2 | 94.4 | 93.8 | 94.7 | 85.8 | 74.3 | 89.8 |
| l = 16 | 97.2 | 94.3 | 94.2 | 94.6 | 86.4 | 74.7 | 90.0 |
| Aligned Prompts | | | | | | | |
| | 97.7 | 95.5 | 95.7 | 95.2 | 89.7 | 75.3 | 91.4 |

FIG. 8

|  | en | zh-TW | zh-CN | ja | ko | AVG |
|---|---|---|---|---|---|---|
| NLI-based Classifier | | | | | | |
| 5-shots | 47.8 | 29.1 | 31.3 | 25.7 | 38.3 | 36.1 |
| 15-shots | 70.8 | 51.8 | 53.1 | 43.5 | 61.8 | 58.3 |
| all | 89.9 | 65.0 | 69.4 | 54.3 | 83.7 | 77.3 |
| Vanilla Classifier | | | | | | |
| 5-shots | 9.4 | 3.6 | 4.4 | 4.2 | 6.6 | 5.6 |
| 15-shots | 10.2 | 13.7 | 13.7 | 9.2 | 11.5 | 9.9 |
| all | 90.6 | 69.6 | 71.1 | 53.7 | 84.0 | 78.8 |

FIG. 10

|  | en | zh-TW | zh-CN | ja | ko | AVG |
|---|---|---|---|---|---|---|
| 5-shots | | | | | | |
| FT | 9.4 | 3.6 | 4.4 | 4.2 | 6.6 | 5.9 (3.3) |
| PT | 51.3 | 17.0 | 16.8 | 15.3 | 30.8 | 24.9 (11.5) |
| APT | 65.2 | 49.3 | 52.1 | 38.5 | 59.3 | 55.2 (13) |
| 15-shots | | | | | | |
| FT | 10.2 | 13.7 | 13.7 | 9.2 | 11.5 | 28.7 (17.4) |
| PT | 75.8 | 50.2 | 56.5 | 43.6 | 63.7 | 58.2 (23) |
| APT | 78.0 | 59.1 | 62.9 | 47.7 | 71.7 | 66.5 (0.5) |
| all | | | | | | |
| FT | 90.6 | 69.6 | 71.1 | 53.7 | 84.0 | 78.8 (0.5) |
| PT | 89.7 | 63.9 | 68.2 | 55.6 | 82.1 | 76.8 (0.1) |
| APT | 90.1 | 67.7 | 70.5 | 54.5 | 84.4 | 77.7 (0.5) |

FIG. 11

|  | en | zh-TW | zh-CN | ja | ko | AVG |
|---|---|---|---|---|---|---|
| 5-shots | | | | | | |
| FT | 47.8 | 29.1 | 31.3 | 25.7 | 38.3 | 24.2 (6.8) |
| PT | 59.9 | 38.7 | 40.0 | 30.0 | 49.4 | 38.1 (16.5) |
| APT | 69.8 | 51.1 | 52.4 | 45.4 | 64.8 | 59.8 (1.6) |
| 15-shots | | | | | | |
| FT | 70.8 | 51.8 | 53.1 | 43.5 | 61.8 | 46.0 (11.9) |
| PT | 75.8 | 54.8 | 57.8 | 43.5 | 68.7 | 60.3 (2.6) |
| APT | 89.7 | 58.5 | 62.8 | 51.8 | 75.0 | 67.5 (1.1) |
| all | | | | | | |
| FT | 89.9 | 65.0 | 69.4 | 54.3 | 83.7 | 76.8 (0.6) |
| PT | 89.7 | 56.4 | 56.4 | 36.0 | 83.9 | 75.6 (0.4) |
| APT | 90.2 | 66.1 | 68.4 | 52.0 | 85.2 | 78.9 (0.2) |

FIG. 12

|  | en | zh-TW | zh-CN | ja | AVG |
|---|---|---|---|---|---|
| 15-shots | | | | | |
| PT | 71.7 | 9.2 | 10.1 | 5.1 | 46.6 (1.9) |
| APT | 73.3 | 20.5 | 22.1 | 13.2 | 52.1 (0.5) |
| all | | | | | |
| FT | 83.1 | 14.3 | 14.9 | 0.4 | 55.9 (0.7) |
| APT | 82.8 | 22.9 | 23.6 | 11.7 | 60.5 (0.7) |

FIG. 14

|  | en | AVG |
|---|---|---|
| 5-shots | | |
| FT | 41.0 | 27.8 (3.3) |
| PT | 59.5 | 34.2 (1.2) |
| APT | 62.6 | 38.7 (0.9) |
| 15-shots | | |
| FT | 70.7 | 49.0 (1.1) |
| PT | 70.9 | 45.6 (0.9) |
| APT | 72.4 | 46.9 (1.2) |
| all | | |
| FT | 83.9 | 61.6 (1.0) |
| PT | 83.3 | 55.4 (0.1) |
| APT | 83.5 | 55.5 (0.5) |

FIG. 13

SYSTEMS AND METHODS FOR CROSS-LINGUAL TRANSFER LEARNING

CROSS REFERENCE(S)

The instant application is a nonprovisional of and claim priority under 35 U.S.C. 119 to U.S. provisional application No. 63/493,166, filed Mar. 30, 2023, which is hereby expressly incorporated by reference herein in its entirety.

TECHNICAL FIELD

The embodiments relate generally to machine learning systems for conversational language tasks, and more specifically to systems and methods for cross-lingual transfer learning.

BACKGROUND

Machine learning systems have been widely used in natural language processing (NLP) tasks such as conducting a conversation with a human user. Such conversational language tasks often entail tasks such as slot-filling, intent classification, machine translation, question answering, and/ or the like. Unfortunately, most NLP models are trained to perform conversation tasks using datasets in rich-sourced languages, e.g., English or a few other high-resource languages such as Chinese, Spanish, French, etc. The ability to translate or communicate in less-sourced languages remains limited.

Therefore, there is a need for systems and methods for training NLP models for language tasks in diverse languages.

BRIEF DESCRIPTION OF THE DRAWINGS

FIG. 5 is an example logic flow diagram illustrating a method of cross-lingual training for a language model based on the framework shown in FIGS. 1-4, according to some embodiments described herein.

FIGS. 6-14 provide charts illustrating exemplary performance of different embodiments described herein.

Figure 1:
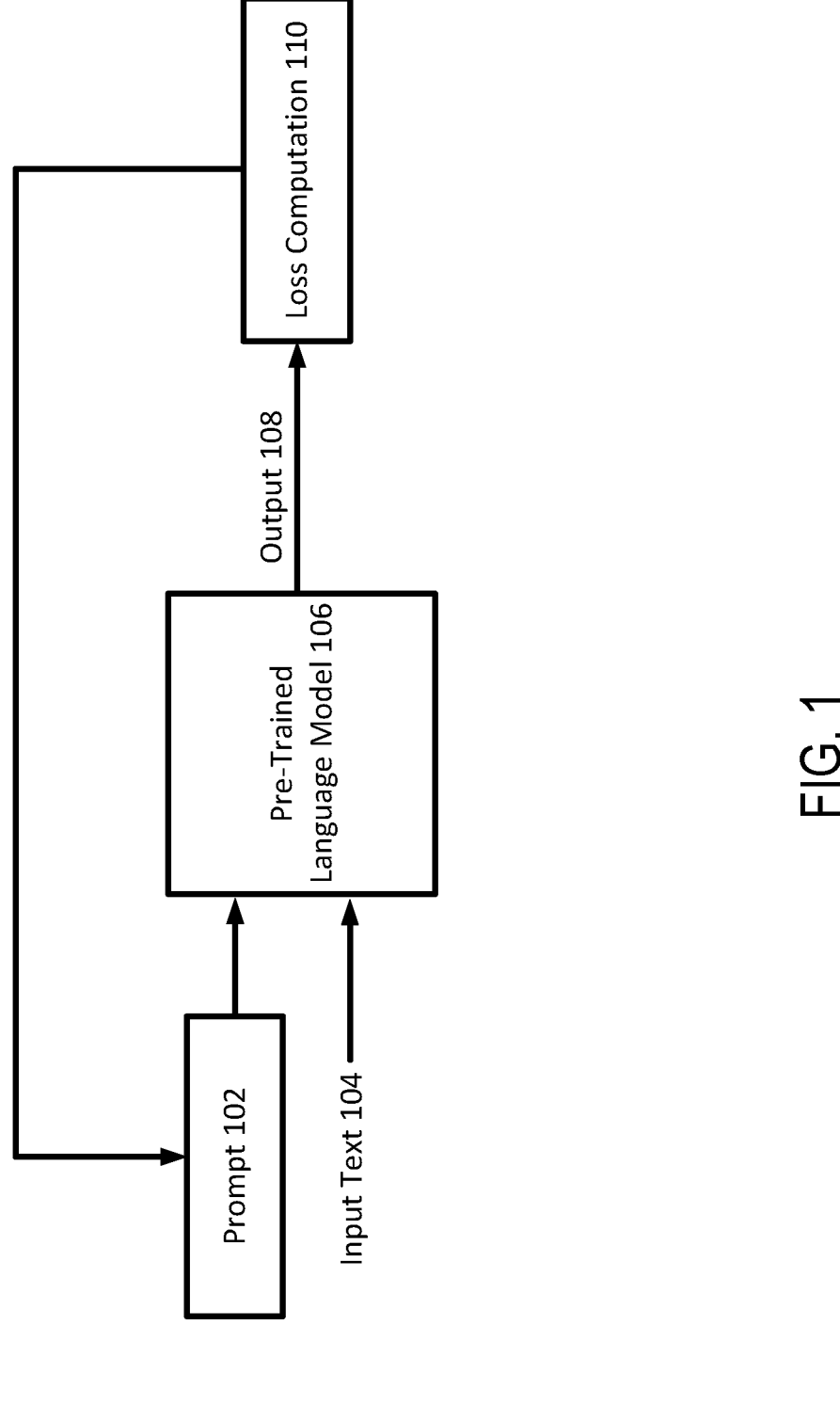
FIG. 1 is a simplified diagram illustrating a prompted language model training framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Language models (LMs) such as GPT-4 may be pretrained and then fine-tuned for a wide variety of tasks such as question answering machine translation, intent classification, and/or the like. Fine-tuning the parameters of a large LM (e.g., 560 million parameters], however, can often be expensive in terms of memory and computation. For this reason, a more efficient method of training a LM for a task is to pair the LM with different prompts prepended to a training text input such that during training, the prompts are updated while the LM itself is kept frozen at backpropagation. The tuned prompts are then prepended to every testing input to pass to the LM to generate a testing output. Such prompt tuning, due to the much smaller size of the prompt compared to the large LM, is much more computationally efficient.

For example, "hard" prompts are a natural language indicator that provides guidance to the LM on what the NLP task is, such as: "Predict the next utterance in this conversation," "the intent of this statement is [identify the intent]," and/or the like. Such hard-prompts are generally optimized by human effort. In comparison, "soft" prompts are vector inputs which may achieve similar function as the hard prompts but are in the form of sequences of tokens that are similarly prepended to an input text to the LM. An advantage of soft prompts is they are more amendable to tuning via an automated learning process. Tuning a soft prompt is effectively training the LM using a much smaller set of parameters.

A problem arises when attempting to tune a prompt for a task that one wishes to function well across different languages (e.g., English, French, Japanese . . . ). Generally, a single tuned prompt performs poorly when attempting to use it on different languages. This is true even when the LM itself is trained on a variety of different languages.

In view of the need for improved prompt tuning methods across different language domains, embodiments herein describe a method for tuning aligned prompts, especially for conversational tasks. The method includes creating a positive pair comprising a conversation in one language, with a translation of that conversation in a second language. Both of the conversations have tokens randomly masked. The soft prompt is prepended to each of the conversations, and tuned by using a loss objective on the LM output corresponding to both inputs in different languages. The main loss objective is a reconstruction loss, which is a measure of how well the LM reconstructs the original un-masked conversations given the prompt and the masked conversations as input. The result is an "aligned" prompt (i.e., one which works effectively across languages). In this way, the prompt is tuned to adapt to inputs in different languages. Further tuning of the aligned prompt may be performed for a variety of different downstream tasks.

Embodiments described herein provide a number of benefits. For example, improved accuracy is achieved over other prompt-tuning methods, especially for cross-lingual tasks using the same prompt. By achieving sufficient performance with only prompt tuning, memory and computation resources of a computer/network are minimized, as the parameters of the LM itself do not need to be re-trained. Since a given prompt trained using methods described herein works across languages, memory and computation resources are conserved by not requiring prompt tuning individually for each desired language, and storing said trained prompts individually for each language. Further, embodiments herein provide good results even when working with smaller datasets, for example when a specific language does not have as much data available as other languages.

Overview

FIG. 1 is a simplified diagram illustrating a prompted language model training framework 100 according to some embodiments. The framework 100 comprises a pre-trained language model 106 which receives a prompt 102 and input text 104. The pretrained language model 106 generates an output 108 according to a specific training task in response to an input that concatenates the prompt 102 and the input text 104. Loss computation 110 is performed on output 108, and the computed loss is used to update/tune prompt 102 via backpropagation while the pre-trained language model 106 is kept frozen.

For example, for conversation tasks, the input text 104 may be a conversation between two people (e.g., a chat). Prompt 102 may be one be used to indicate to pre-trained language model 106 how to process the input text 104. For example, prompt 102 may provoke model 106 to output a prediction of a next utterance in the conversation. Model 106 may be a baseline language model trained on a variety of different languages. As is described further with reference to FIG. 2, prompt 102 may be tuned/trained such that the prompt 102 is "aligned" such that it functions well across different languages. In some embodiments, prompt 102 may be comprised of multiple prompts, or in other words, a prompt with multiple tokens.

Figure 2:
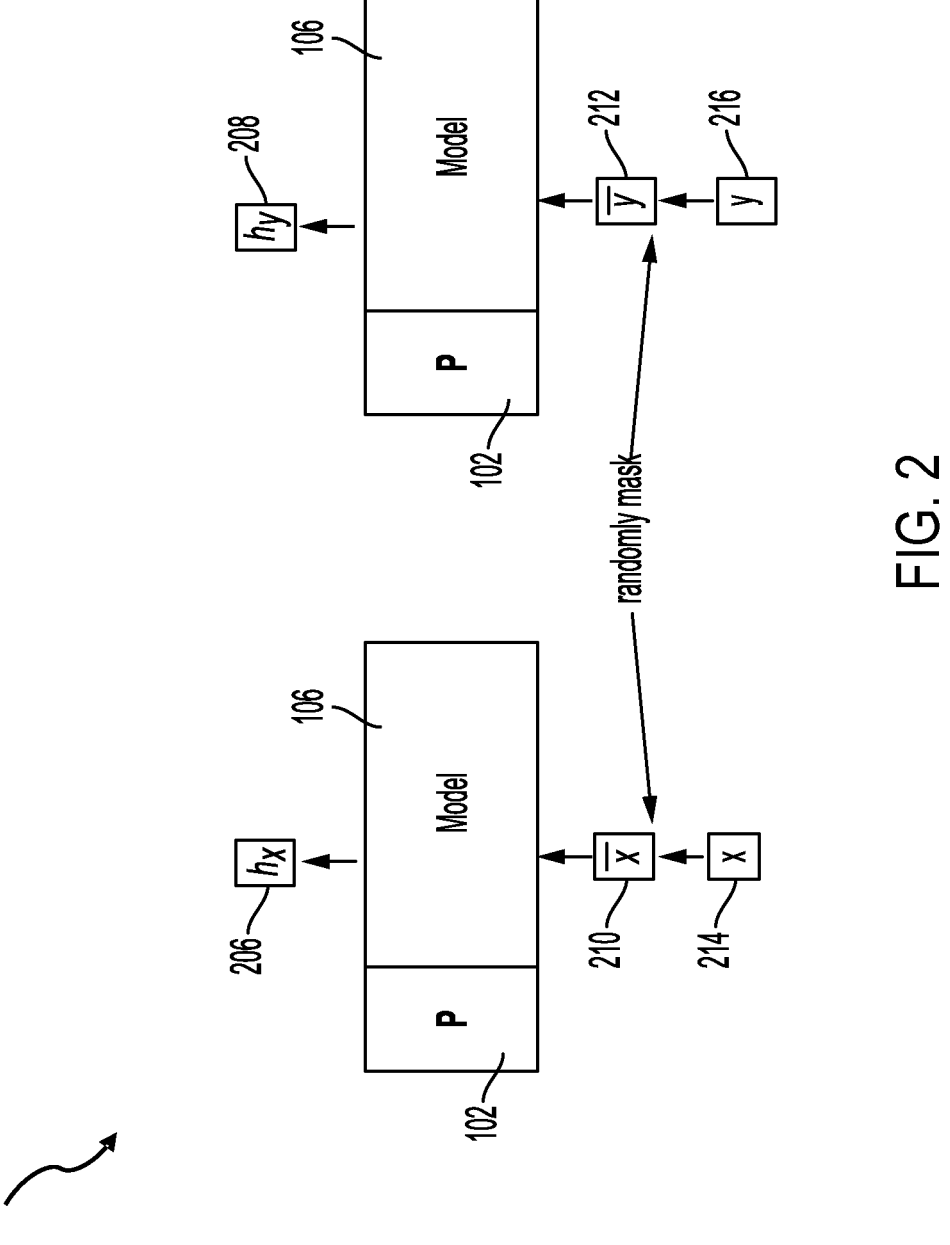
FIG. 2 is a simplified diagram illustrating a cross-lingual training framework according to some embodiments.

FIG. 2 is a simplified diagram 200 illustrating a cross-lingual training framework implemented as an example of the training framework 100 in FIG. 1, according to some embodiments. Language model 106 is illustrated twice in diagram 200, as it is used twice with different inputs to generate respective outputs, each using the same prompts 102, illustrated as the letter P. Note that the prompt 102 is illustrated as being adjoined to model 106. The prompt 102 is an input to model 106 but may also be conceptualized as additional trainable parameters which are part of model 106.

To train an aligned prompt 102, a positive pair of conversation inputs 214 and 216 are used, represented here as x and y. inputs 214 and 216 form a positive pair as they are conversations in different languages, but with the same semantic meaning. For example, input 214 may be a conversation in English, and input 216 may be the same conversation in Portuguese. The pair of inputs 214 and 216 may be generated by translating (e.g., using a neural-network-based translation model) input 214 into a second language. In other embodiments, a dataset may be used which contains pairs of conversations which have the same semantic meaning, without the need to translate. In some embodiments, the training dataset includes conversations with multiple turns (e.g., 20). The inputs 214 and 216 may be selected as subsets of the full conversations, for example input 214 may be a random selection of two consecutive turns in a conversation, and input 216 may be the same two consecutive turns translated into another language.

Inputs 214 and 216 may be tokenized, and then have tokens randomly masked. The tokenized and masked conversations are represented here as masked conversation 210 illustrated as $\bar{x}$, and masked conversation 212 illustrated as $\bar{y}$. Since the sentences are tokenized in their respective languages there is no one-to-one mapping between tokens, so the random mask may be random for each masked conversation 210 and 212. Masked conversations 210 and 212 are each input to model 106 with prompt 102 to produce outputs 206 and 208 respectively, represented here as $h_x$ and $h_y$. Outputs 206 and 208 may be vector representations associated with a semantic meaning, which may subsequently be used to generate text.

Outputs 206 and 208 may be used to compute a loss objective for updating prompt 102. The updating of prompt 102 may be done after a batch of input/output pairs are performed. One loss objective which may be used to tune an aligned prompt 102 is a reconstructive loss, or more specifically a masked language modeling (MLM) loss. MLM is defined based on the reconstruction loss of a certain percentage of randomly masked input tokens given the rest of the context. This loss is useful to adapt backbone models 106 to the conversation domain. Formally, the MLM loss may be defined as:

$$L_{mlm} = -\frac{1}{M}\left(\sum \log prob(x_m) + \sum \log prob(y_m)\right)$$

where M is the total number of masked tokens in <x, y>. and $x_m$ and $y_m$ are the masked tokens in xi and yi, respectively. prob(xm) and prob(ym) denote the probabilities of generating xm and ym from their corresponding masked tokens, respectively. A gradient may be computed based on the MLM loss, and prompt 102 may be updated based on the gradient in order to minimize the MLM loss. This may be done iteratively with small steps in order to perform gradient descent.

An additional loss which may be used together with the MLM loss in order to enhance the representations is a contrastive loss. Instead of using a positive sample y which corresponds to a translation of x, a negative sample y is selected from another conversation or another portion of the same conversation, but still translated to another language. The negative sample together with the input x forms a negative pair. In some embodiments, negative samples y are all the other translations in a same mini-batch that don't correspond to the same portion of the same conversation. Similar to the MLM loss, the pair of conversations are randomly masked. Formally, the contrastive loss may be defined as:

$$L_{contra} = -\frac{1}{N}\left(\sum \log \frac{\exp(sim(h_x,h_y)/\tau)}{\sum_{y'}\exp(sim(h_x, h_{y'})/\tau)}\right)$$

where $\tau$ is the temperature term, N is the mini batch size, y' is from mini batch. $h_x$ and $h_y$ are the representations (i.e., outputs 206 and 208) of masked sequence x and y respectively. For example, the representations $h_x$ and $h_y$ may be classification (i.e., [cls]) tokens output from a BERT model as described in Devlin et al., BERT: Pre-training of deep bidirectional transformers for language understanding, Proceedings of the 2019 Conference of the North American Chapter of the Association for Computational Linguistics: Human Language Technologies, Volume 1 (Long and Short Papers), pp 4171-4186, 2019. Further, sim in the equation above is the similarity function (e.g., cosine similarity).

The contrastive loss may be used together with the MLM loss, for example by computing a weighted sum of the two losses. The combined loss may be used to update the prompt 102. For example, P may be updated in small steps which minimize the computed loss (i.e., gradient descent).

Once the prompt 102 is tuned, it may be further tuned for specific downstream tasks. For example, an intent classification task. This fine-tuning may be performed using a single language or multiple languages as the training dataset. The loss function used for the further training may be dependent on the specific type of language task. However, the starting point of the initially tuned prompt 102 may provide additional cross-lingual capability which would otherwise not be realized if only training for the specific downstream task. Performance on various downstream tasks is discussed with respect to FIGS. 8-14.

Computer and Network Environment

Figure 3:
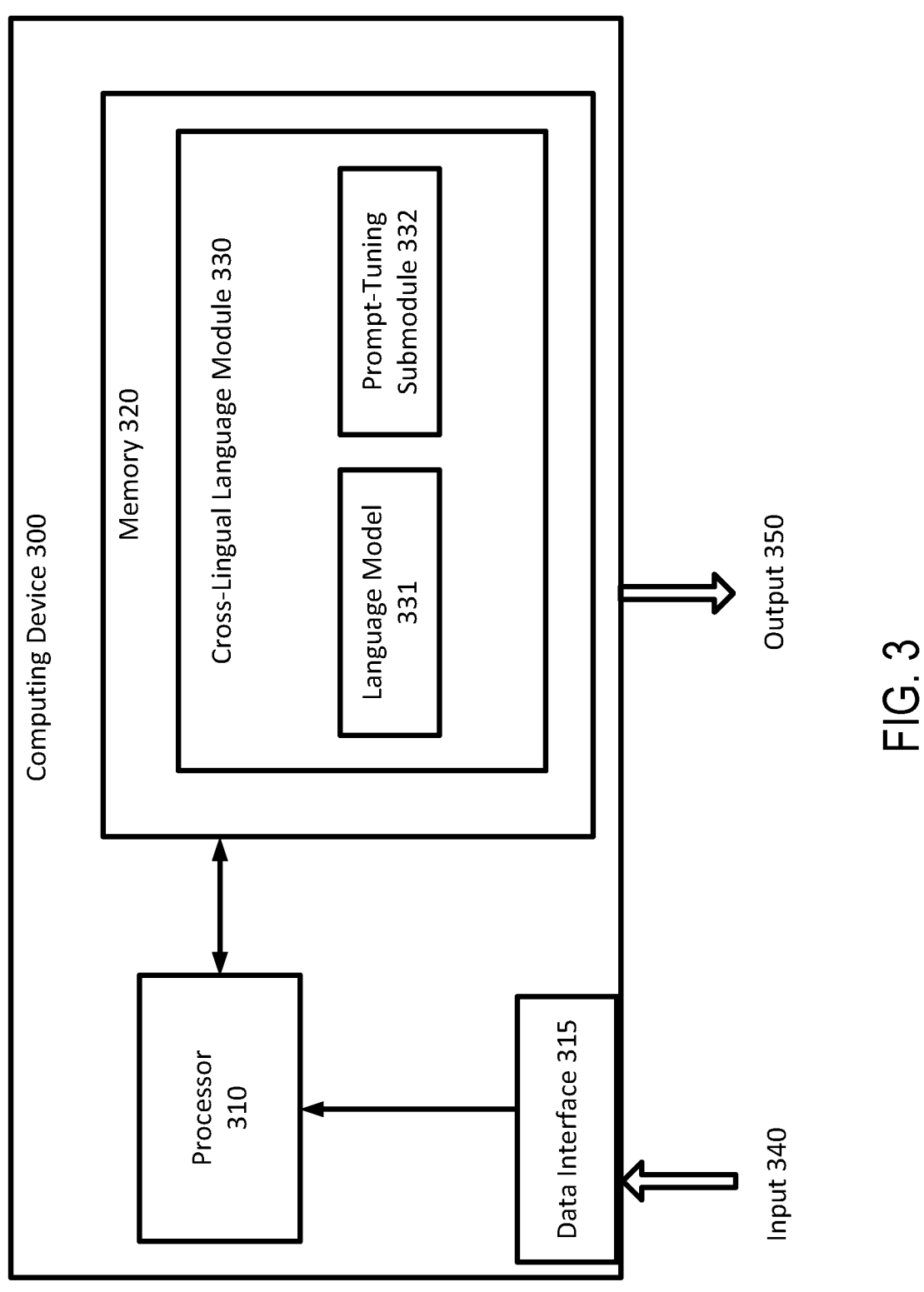
FIG. 3 is a simplified diagram illustrating a computing device implementing the cross-lingual training framework described in FIGS. 1-2, according to some embodiments.

FIG. 3 is a simplified diagram illustrating a computing device implementing the cross-lingual training framework described in FIGS. 1-2, according to one embodiment described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for cross-lingual language module 330 that may be used to implement and/or emulate the systems and models, and/or to implement any of the methods described further herein. cross-lingual language module 330 may receive input 340 such as an input training data (e.g., text conversation data in one or more languages) via the data interface 315 and generate an output 350 which may be a tuned prompt, and/or the output of language model 331 as prompted by the tuned prompt.

The data interface 315 may comprise a communication interface, a user interface (such as a voice input interface, a graphical user interface, and/or the like). For example, the computing device 300 may receive the input 340 (such as a training dataset or testing text) from a networked database via a communication interface. Or the computing device 300 may receive the input 340, such as input text (e.g., input text 104 in FIG. 1), from a user via the user interface.

In some embodiments, the cross-lingual language module 330 is configured to tune an aligned prompt for cross-lingual natural language tasks such as conversation tasks. The cross-lingual language module 330 may further include language model 331 (e.g., similar to model 106 in FIGS. 1-2) and prompt-tuning submodule 332.

In one embodiment, the cross-lingual language module 330 may be implemented by hardware, software and/or a combination thereof.

In one embodiment, language model 331 may be implemented via an artificial neural network. The neural network comprises a computing system that is built on a collection of connected units or nodes, referred to as neurons. Each neuron receives an input signal and then generates an output by a non-linear transformation of the input signal. Neurons are often connected by edges, and an adjustable weight is often associated with the edge. The neurons are often aggregated into layers such that different layers may perform different transformations on the respective input and output transformed input data onto the next layer. Therefore, the neural network may be stored at memory 320 as a structure of layers of neurons, and parameters describing the non-linear transformation at each neuron and the weights associated with edges connecting the neurons. An example neural network may be a BERT model or other transformer-based language model, and/or the like.

In one embodiment, the neural network based language model 331 may be trained by updating the underlying parameters of the neural network based on a loss function. Given the computed loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, and/or any other medium from which a processor or computer is adapted to read.

Figure 4:
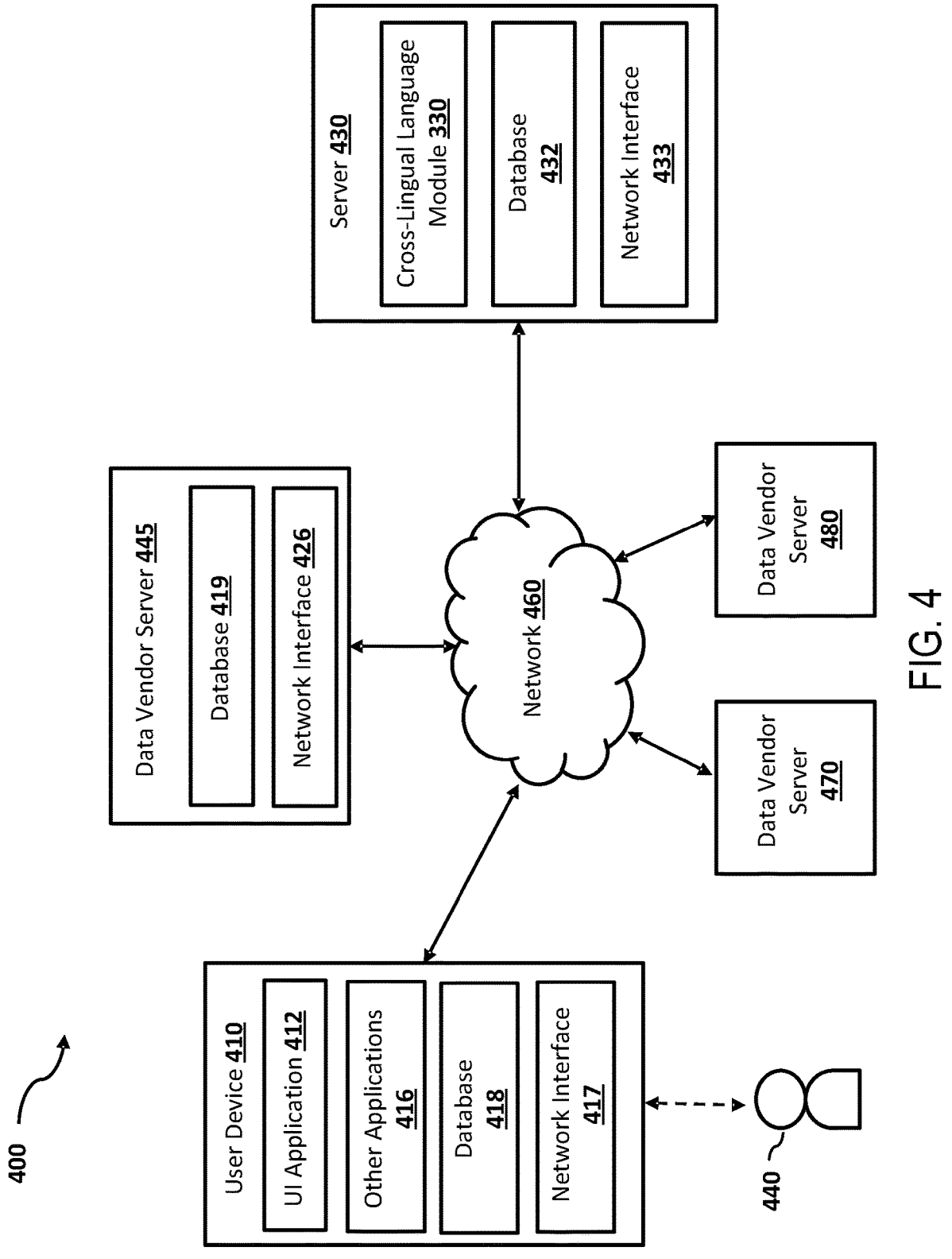
FIG. 4 is a simplified block diagram of a networked system suitable for implementing the cross-lingual training framework described in FIGS. 1-3 and other embodiments described herein.

FIG. 4 is a simplified block diagram of a networked system 400 suitable for implementing the cross-lingual training framework described in FIGS. 1-2 and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 300 described in FIG. 3, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and May be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLER. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating an output of the language model (e.g., model 106 in FIGS. 1-2 or model 331 in FIG. 3) from the server 430 and display the message via the UI application 412. In other embodiments, user device 410 may include additional or different modules having specialized hardware and/or software as required. In another example, the UI application 412 may receive a user textual input (e.g., by a user manually typing) and/or a user audio input (e.g., by a user articulating the input). Such user inputs may correspond to a NLP input 340 in FIG. 3, e.g., in scenarios when a user 440 is communicating with an intelligent chatbot that is implemented based on the cross-lingual language model 330.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view language model outputs.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training datasets including text conversation data in one or more languages to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

The server 430 may be housed with the cross-lingual language module 330 and its submodules described in FIG. 3. In some implementations, cross-lingual language module 330 may receive data from database 419 at the data vendor server 445 via the network 460 to generate a tuned prompt. The tuned prompt may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the cross-lingual language module 330. In one implementation, the database 432 may store previously generated prompts, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Example Work Flows

FIG. 5 is an example logic flow diagram illustrating a method 500 of cross-lingual training for a language model based on the framework shown in FIGS. 1-4, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the cross-lingual language module 330 (e.g., FIGS. 3-4) that performs aligned prompt tuning.

As illustrated, the method 500 includes a number of enumerated steps, but aspects of the method 500 may include additional steps before, after, and in between the enumerated steps. In some aspects, one or more of the enumerated steps may be omitted or performed in a different order.

At step 501, a system (e.g., computing device 300 in FIG. 3 and/or devices in FIG. 4), receives, via a data interface (e.g., data interface 315 in FIG. 3), a first conversational text in a first natural language (e.g., conversation input 214 in FIG. 2) and a second conversational text in a second natural language (e.g., conversation input 216 in FIG. 2), wherein the first conversational text contains a first set of tokens and the second conversational text has a same semantic meaning as the first conversational text and contains a second set of tokens. The second conversational text may be, for example, a translation of the first conversational text. In some embodiments, the translation is performed automatically using a trained translation model. In further embodiments, the system receives pairs of conversation data in multiple languages. The first and second conversational texts may be randomly sampled from a dataset. For example, a dataset may include full conversations with multiple utterances by two or more parties. Each of the full conversations in the dataset may be a source of utterances sampled for prompt tuning. When selecting data to train, a pair of sequential utterances in one of the full conversations may be selected randomly. Thus, each of the first and second conversational texts may include two sequential utterances (and the translation respectively).

At step 502, the system masks a subset of the first set of tokens and a subset of the second set of tokens, thereby resulting in a masked first set of tokens (e.g., masked conversation 210 in FIG. 2) and a masked second set of tokens (e.g., masked conversation 212 in FIG. 2), respectively. The masking may be performed independently for each of the first and second set of tokens. Since they are in different languages, the tokens will not necessarily have a one-to-one relationship between the two.

At step 503, the system generates, by a neural network based language model (e.g., model 105 in FIGS. 1-2 or language model 331 in FIG. 3), a first predicted output (e.g., output 206 in FIG. 2) and a second predicted output (e.g., output 208 in FIG. 2), based on a first input of the masked first set of tokens prepended with the prompt (e.g., prompt 102 in FIGS. 1-2) and a second input of the masked second set of tokens prepended with the prompt, respectively.

At step 504, the system computes a loss objective including at least a masked language model loss based on the first predicted output and the first conversational text, and the second predicted output and the second conversational text. For example, this may be computed as the masked language modeling (MLM) loss described herein. By training with this loss the prompt is tuned such that the combination of the prompt and model have the capability to predict masked tokens with high likelihood in multiple languages. Additional loss objectives may be combined with this loss objective. For example, a contrastive loss may also be computed. For the contrastive loss, a third conversational text different than the first and second conversational texts may be received via the data interface. This may be a text which does not have the same semantic meaning (semantically unaligned) as either the first or second conversational text, but may be in the first language, the second language, or another language. As such, the third conversational text is a negative sample, which the model is expected to produce an output when given as an input. The system may mask a third set of tokens which represent the third conversational text, prepend the prompt, and input it to the model. The output associated with the first conversational text may be compared with both the positive sample output associated with the second conversational text, and the negative sample output associated with the third conversational text for a second loss objective. For example, the second loss objective may be a contrastive loss as described herein. By training with this loss the prompt is tuned such that the combination of the prompt and model result in outputs which are distributed in the representation space. The two loss objectives may be combined, for example they may be summed before being used to update the prompt.

At step 505, the system updates the prompt based on the computed loss objective (e.g, the first and/or the second loss objective described above) via backpropagation while keeping the language model frozen. This may include computing gradients of the loss objective(s) with respect to the prompt, and updating the prompt in a direction which minimizes the loss. The process described above may be repeated to iteratively update the prompt so as to perform gradient descent. The prompt may be updated once for each set of conversational text, or may be updated based on loss objectives computed on a batch of conversational text. After a sufficient number of iterations, the prompt may be considered tuned. The prompt may be further tuned using an additional loss objective for another downstream task. For example, a task may be predicting the next utterance in a conversation (i.e., the response utterance). While this is not the task on which the prompt was initially tuned, by pretuning the prompt in the manner described herein, the prompt is observed to maintain a higher level of cross-lingual capability, even when the prompt is tuned for a downstream task using data in a single language. This may also allow for pre-tuning to occur on a larger dataset with multiple languages, while a downstream task is trained using a smaller available dataset for a specific task for which only a single language of data is available, but still allowing the prompt/model combination to perform well.

Example Results

FIGS. 6-14 provide charts illustrating exemplary performance of different embodiments described herein. Experiments were performed using the Schema-Guided Dialogue (SGD) dataset as described in Rastogi et al., Towards scalable multi-domain conversational agents: The schema-guided dialogue dataset, Proceedings of the AAAI Conference on Artificial Intelligence, volume 34, pp. 8689-8696, 2020. The SGD dataset has about 16K dialogues and 20 domains. For each domain, there are a different number of intents, services and dialogues. Each service provides a schema listing the supported intents along with their natural language descriptions. For example, service "payment" has two intents "MakePayment" and "RequestPayment". The description of an intent called "MakePayment" is "Send money to your contact". Zero-shot evaluation is used, because lots of intents in the dev and test are unseen in the training set. For training, only 5-shots per service were sampled as the training set and evaluated on the whole dev set. For cross-lingual results on other languages, the SGD dataset was augmented by including automatically generated translations of the SGD data into a number of languages. we evaluate on the translated utterance from XSGD.

Another dataset used for evaluation is the MASSIVE dataset as described in FitzGerald et al., Massive: A 1m-example multi-lingual natural language understanding dataset with 51 typologically-diverse languages, 2022. There are 52 languages and about 1 million utterances in this dataset. For each language, there are about 11k train utterances, about 2k dev utterances, about 3K test utterances. This was used for evaluation on two conversation understanding tasks: intent classification and slot filling. There are 60 intents and 55 slot types. Accuracy and F1 score are the metrics for intent classification and slot filling, respectively.

The language model used for the experiments was a large multilingual language model. One is XLM-R as described in Conneau et al., Unsupervised cross-lingual representation learning at scale, Proceedings of the 58th Annual Meeting of the Association for Computational Linguistics, pp. 8440-8451, 2020. Another model considered was XLMRO-BERTa-XL as described in Liu et al., Roberta: A robustly optimized BERT pretraining approach, CoRR, abs/1907.11692, 2019.

Two separate classifiers were used for different downstream tasks, an intent classifier and a slot classifier. Intent classification is a sentence classification task. Experiments were performed using [CLS] representation from the encoder as the sentence representation. Two different intent classifiers, natural language inference (nli)-based classifier and vanilla classifier, were considered in the experiments. For example, a pair of utterances "What can I do for you?" and "I want to rent a movie" may be paired with the intent "RentMovie," where the "RentMovie" intent is described as an intent to find movies to watch by genre and, optionally, director or actors. A vanilla classifier may classify by a label (e.g., "10") which is associated with the intent. Vanilla classifier uses the utterance representation to predict intent label. The learning and inference is done as a multiple label classifier.

An NLI-based classifier may include an intent description, and then a indication of whether that intent is entailed or not in the utterance. NLI-based text classification may be as described in Qu et al., Few-show intent classification by gauging entailment relationship between utterance and semantic label, Proceedings of the $3^{rd}$ Workshop on Natural Language Processing for Conversational AI, pp. 8-15, 2021. An advantage of using nli-based classifiers is their ability to evaluate unseen intent labels if their descriptions are known. NLI-based text classification shows superior performance in few-shot setting. In NLI-based text classification scenario, utterance and intent description or intent name are combined to make a prediction. Each sample in dataset can be converted into a positive sample. Negative samples are constructed in the mini batch by sampling a negative intent description. In order to balance the training process, the same amount of positive samples and negative samples were sampled in each batch. Cross-entropy loss was used during training. For inference, the label with largest entailment score was selected. The prediction is correct if and only if the predicted label is correct and the largest entailment score is larger than 0.51.

For the slot classifier, slot filling is a sequence labeling task. For each position, the sequence representation was used at each position to predict the slot. One projection layer is used as the token classification head. The predicted labels are converted into BIO format for F1 score evaluation.

Figure 6:
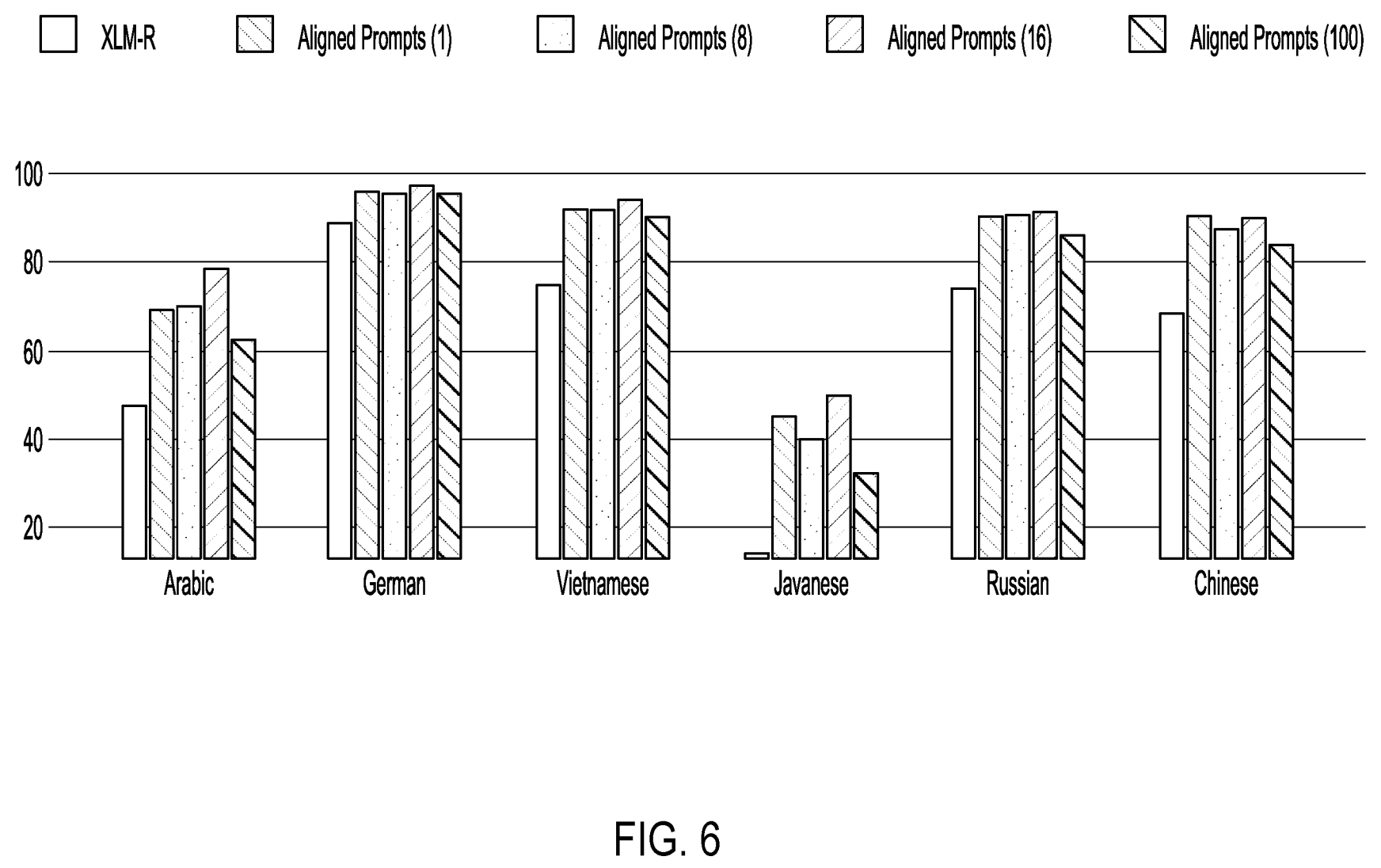

FIG. 6 illustrates exemplary performance on a retrieval task. Specifically, the classification (e.g., [CLS] token representation) of a sentence and its translation are compared. Baseline is performed with a prompt that is not tuned according to the methods described herein. Other results are shown with aligned prompts of different lengths (i.e., number of tokens). Sentences are from the Tatoeba dataset as described in Artetxe and Schwenk, Massively multilingual Sentence Embeddings for Zero-Shot Cross-Lingual Transfer and Beyond, Transaction of the ACL 2019, 2019. Results are displayed for several languages. Notably, the results demonstrate that aligned prompts can achieve significantly higher retrieval accuracy, even when the prompt length is only 1. Furthermore, performance can be further improved with additional prompts; however, it is important to note that using too many prompts can actually hurt performance. In the other experiments described herein, the prompt length was set to 16, unless otherwise specified.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

FIG. 7 illustrates a comparison of results when prompts are fine-tuned on different datasets. The first dataset is not comprised of conversation pairs, specifically the OPUS dataset as described in Tiedemann, Parallel data, tools and interfaces in OPUS, Proceedings of the Eighth International Conference on Language Resources and Evaluation (LREC'12), pp. 2214-2218, 2012. The other dataset is conversation pairs, specifically, XSGD as discussed above. To evaluate the relative effectiveness of the different datasets, parallel datasets were randomly selected from OPUS of a similar size as that of XSGD, and aligned prompts were learned, and fine-tuned for an intent-classification task. The table in FIG. 7 presents the results of intent classification on a conversation. The results demonstrate that of the non-conversational domain dataset across different settings (5-shots, 15-shots, all-shots).

FIGS. 8-14 represent experiments on conversation downstream tasks, with three tuning methods. The first tuning method is fine tuning (FT), where all backbone model parameters and downstream task classifiers are updated. The cost is expensive and high-memory is demanded. Each task needs to keep a separated copy of the model. The second tuning method is prompt tuning (PT), where the backbone model parameters are fixed. Only a small number of parameters (prompts) and task classifiers parameters are updated. For example, continuous prompts and layer prompts may be used. The third tuning method is aligned prompt tuning (APT), according to some embodiments herein. With parallel translation data, an aligned prompt is learned for aligned cross-lingual representation. These prompts can be used for a warm-up start for downstream tasks with prompt learning.

FIG. 8 illustrates the intent classification results when training on English-only data and evaluating on all languages. Prompt tuning has better cross-lingual transferability on this task. In addition, aligned prompts improve performance further.

Figure 9:
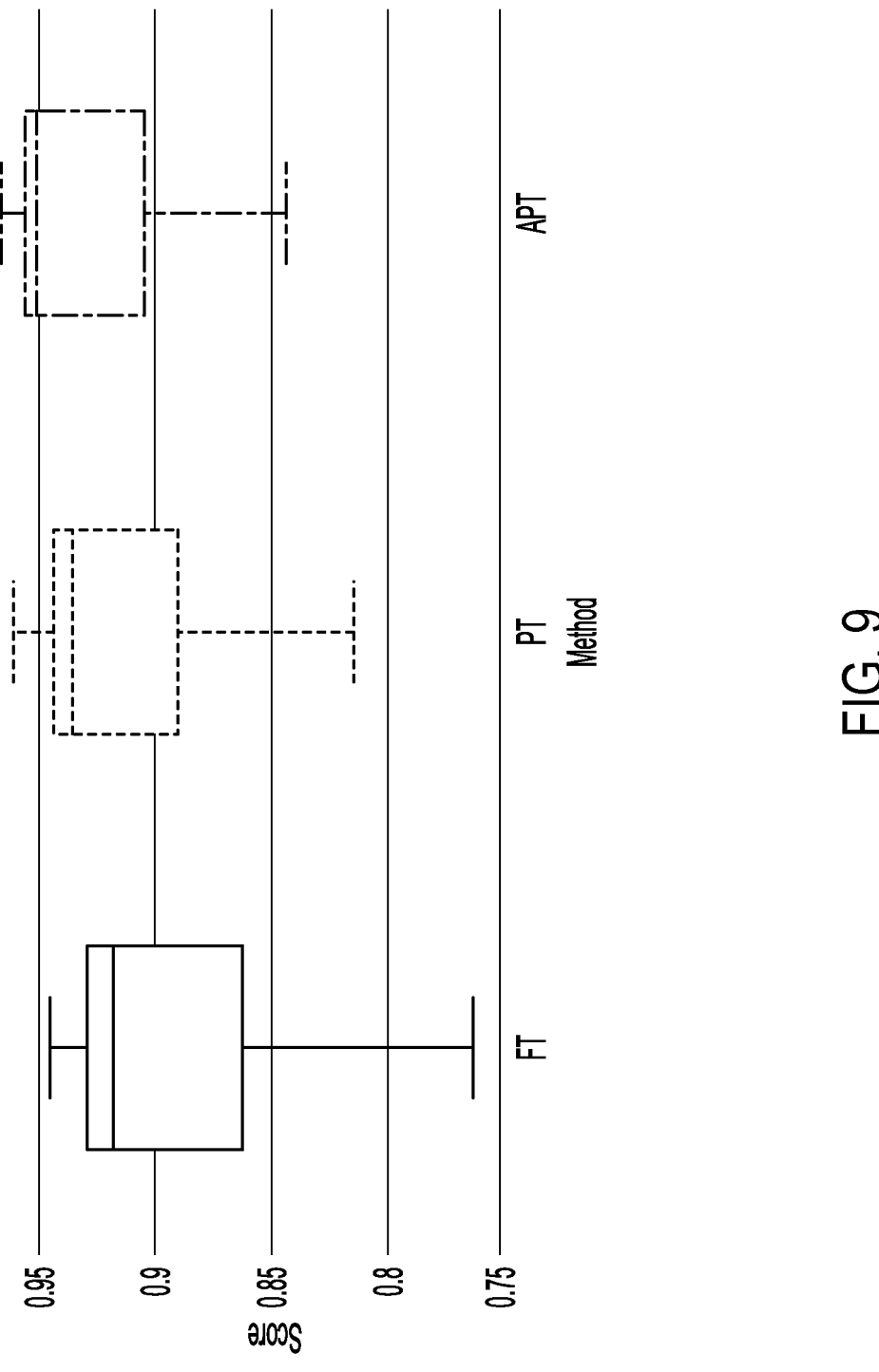

FIG. 9 illustrates a performance comparison of the three different tuning methods (FT, PT, and APT). The experiments were performed on an intent classification task over all languages on XSGD. The scores represent the accuracy of each language. The figure indicates that prompt tuning outperforms fine-tuning, while aligned prompt tuning achieves the best performance.

FIG. 10 illustrates results of an experiment on MASSIVE benchmark intent classification task when training on English only and evaluating on all 52 languages. Results are reported for two different classifiers: the nli-based classifier and the vanilla classifier. Both of the intent classifiers achieve higher performance with more data. In few-shot experiments, the NLI-based classifier out-performs the vanilla classifier by a significant margin. The average performance on all 52 languages reaches 58.3% accuracy with only 15 samples per intent. However, the vanilla classifier works better with the full data.

FIG. 11 illustrates performance on 5-shots, 15-shots, and all-shots for vanilla classifiers on intent tasks. Significant gains are achieved with prompt tuning method (from 5.9% to 24.9% on 5-shots and from 28.7% to 58.2% on 15 shots). As illustrated, aligned prompts can further improve performance, with the best results obtained in few-shot settings. Additionally, the variances in task performance across all languages with aligned prompts are significantly smaller than those observed with fine-tuning and prompt tuning only. Although prompt tuning achieves higher accuracies on few-shot settings than fine-tuning, there is still a small gap, even with aligned prompts and full data training.

FIG. 12 illustrates performance on 5-shots, 15-shots, and all-shots for nli-based classifiers on intent tasks. The illustrated results are of fine-tuning with prompt tuning and aligned prompts for the MASSIVE dataset. With aligned prompts, strong accuracy results are achieved of 59.8% on 5-shots and 67.7% on 15-shots. Moreover, the English result on 15-shots with aligned prompts is comparable to the result obtained from full data training. These findings suggest that NLI-based classifiers with aligned prompts can efficiently learn with few samples. Additionally, aligned prompts consistently outperform other methods in this setting, indicating strong modeling ability and cross-lingual transfer ability.

The results presented in FIGS. 11-12 show significant improvements with aligned prompts as compared to prompting tuning alone. For instance, the improvements for vanilla classifiers are 30.3%, 8.3%, and 0.9% for 5-shots, 15-shots, and full data training, respectively. Similarly, for NLI-based classifiers, the gains are 11.7%, 7.2%, and 3.3% for the same settings. Note that there is a clear trend where the gain of cross-lingual transfer ability decreases as more English training data is used. Furthermore, nli-based classifiers exhibit superior cross-lingual transfer ability, particularly in the few-shot setting.

FIG. 13 illustrates exemplary results for a slot-filling downstream task. Results are shown for English, and an averaged results for the other languages. Initial aligned prompts were learned on parallel XSGD data with a prompt length of 16, and a backbone model of XLM-R-XL. As shown in FIG. 13, the fine-tuning results are better than prompt tuning for the 15-shots and full training data settings.

FIG. 14 displays the results of prompt tuning and aligned prompts on the same settings as FIG. 13. There are significant performance gains, particularly for aligned prompts. When scaling up the backbone model size from XLM-R to XLM-R-XL, the improvements with aligned prompts are 5.2% and 5.0% for 15-shots and full English data, respectively. Meanwhile, the improvements with prompt tuning are only 1.0% and 0.5%. This finding indicates that aligned prompts provide better modeling ability when increasing the backbone model size.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural network based language model to conduct a cross-language conversation by tuning a vector input, the method comprising:

receiving, via a data interface, a first conversational text in a first natural language, a second conversational text in a second natural language different from the first natural language, and a third conversational text, wherein the first conversational text contains a first set of tokens, the second conversational text has a same semantic meaning as the first conversational text and contains a second set of tokens, and the third conversational text is semantically unaligned with the first conversational text and contains a third set of tokens;

masking a subset of the first set of tokens, a subset of the second set of tokens, and a subset of the third set of tokens, thereby resulting in a masked first set of tokens, a masked second set of tokens, and a masked third set of tokens respectively;

generating, by the neural network based language model implemented on one or more hardware processors:

a first predicted output based on a first input of the masked first set of tokens prepended with the vector input, a second predicted output, based on a second input of the masked second set of tokens prepended with the vector input, and a third predicted output based on a third input of the masked third set of tokens prepended with the vector input;

computing a loss objective including at least:

a first masked language model (MLM) loss based on a comparison of the first predicted output and the first conversational text using the first input, a second MLM loss based on a comparison of the second predicted output and the second conversational text using the second input, and a comparison of representations of the first input and the third input as a negative pair;

updating the vector input based on the computed loss objective via backpropagation while keeping the neural network based language model frozen; and implementing the neural network based language model to generate a response using an input combining the updated vector input and a conversational input in the first natural language or the second natural language.

2. The method of claim 1, wherein the loss objective further comprises a contrastive loss computed based on representations of the first input and the second input as a positive pair.

3. The method of claim 1, wherein the first conversational text includes an utterance and a response corresponding to the utterance that are randomly selected from a source conversation.

4. The method of claim 1, wherein the computed loss objective is a first computed loss objective according to a first training task, and the method further comprises:

updating the vector input based on a second computed loss objective computed according to a second training task different from the first training task after updating the vector input based on the first computed loss objective while keep the language model frozen.

5. The method of claim 1, further comprising:

receiving, via the data interface, a testing text; and generating, by the language model, a testing output based on a testing input of the testing text prepended with the updated vector input.

6. The method of claim 1, wherein the receiving the second conversational text comprises translating, via a translation model, the first conversational text from the first natural language to the second natural language.

7. A system for training a neural network based language model to conduct a cross-language conversation by tuning a vector input, the system comprising:

a memory that stores the neural network based language model and a plurality of processor executable instructions;

a communication interface that receives a first conversational text in a first natural language, a second conversational text in a second natural language different from the first natural language, and a third conversational text, wherein the first conversational text contains a first set of tokens, the second conversational text has a same semantic meaning as the first conversational text and contains a second set of tokens, and the third conversational text is semantically unaligned with the first conversational text and contains a third set of tokens; and one or more hardware processors that read and execute the plurality of processor executable instructions from the memory to perform operations comprising:

masking a subset of the first set of tokens, a subset of the second set of tokens, and a subset of the third set of tokens, thereby resulting in a masked first set of tokens, a masked second set of tokens, and a masked third set of tokens respectively;

generating, by the neural network based language model implemented on one or more hardware processors:

a first predicted output based on a first input of the masked first set of tokens prepended with the vector input, a second predicted output, based on a second input of the masked second set of tokens prepended with the vector input, and a third predicted output based on a third input of the masked third set of tokens prepended with the vector input;

computing a loss objective including at least:

a first masked language model (MLM) loss based on a comparison of the first predicted output and the first conversational text using the first input, a second MLM loss based on a comparison of the second predicted output and the second conversational text using the second input, and a comparison of representations of the first input and the third input as a negative pair;

updating the vector input based on the computed loss objective via backpropagation while keeping the neural network based language model frozen; and implementing the neural network based language model to generate a response using an input combining the updated vector input and a conversational input in the first natural language or the second natural language.

8. The system of claim 7, wherein the loss objective further comprises a contrastive loss computed based on representations of the first input and the second input as a positive pair.

9. The system of claim 7, wherein the first conversational text includes an utterance and a response corresponding to the utterance that are randomly selected from a source conversation.

10. The system of claim 7, wherein the computed loss objective is a first computed loss objective according to a first training task, and the operations further comprise:

updating the vector input based on a second computed loss objective computed according to a second training task different from the first training task after updating the vector input based on the first computed loss objective while keep the language model frozen.

11. The system of claim 7, the operations further comprising:

receiving, via the communication interface, a testing text; and generating, by the language model, a testing output based on a testing input of the testing text prepended with the updated vector input.

12. The system of claim 7, wherein the receiving the second conversational text comprises translating, via a translation model, the first conversational text from the first natural language to the second natural language.

13. A non-transitory machine-readable medium comprising a plurality of machine-executable instructions which, when executed by one or more processors, are adapted to cause the one or more processors to perform operations comprising:

receiving, via a data interface, a first conversational text in a first natural language, a second conversational text in a second natural language different from the first natural language, and a third conversational text, wherein the first conversational text contains a first set of tokens, the second conversational text has a same semantic meaning as the first conversational text and contains a second set of tokens, and the third conversational text is semantically unaligned with the first conversational text and contains a third set of tokens;

masking a subset of the first set of tokens, a subset of the second set of tokens, and a subset of the third set of tokens, thereby resulting in a masked first set of tokens, a masked second set of tokens, and a masked third set of tokens respectively;

generating, by a neural network based language model implemented on one or more hardware processors;

a first predicted output based on a first input of the masked first set of tokens prepended with a vector input, a second predicted output, based on a second input of the masked second set of tokens prepended with a vector input, and a third predicted output based on a third input of the masked third set of tokens prepended with the vector input;

computing a loss objective including at least:

a first masked language model (MLM) loss based on a comparison of the first predicted output and the first conversational text using the first input, a second MLM loss based on a comparison of the second predicted output and the second conversational text using the second input, and a comparison of representations of the first input and the third input as a negative pair;

updating the vector input based on the computed loss objective via backpropagation while keeping the neural network based language model frozen; and implementing the neural network based language model to generate a response using an input combining the updated vector input and a conversational input in the first natural language or the second natural language.

14. The non-transitory machine-readable of claim 13, wherein the loss objective further comprises a contrastive loss computed based on representations of the first input and the second input as a positive pair.

15. The non-transitory machine-readable of claim 13, wherein the first conversational text includes an utterance and a response corresponding to the utterance that are randomly selected from a source conversation.

16. The non-transitory machine-readable of claim 13, wherein the computed loss objective is a first computed loss objective according to a first training task, the operations further comprising:

updating the vector input based on a second computed loss objective computed according to a second training task different from the first training task after updating the vector input based on the first computed loss objective while keep the language model frozen.

17. The non-transitory machine-readable of claim 13, the operations further comprising:

receiving, via the data interface, a testing text; and generating, by the language model, a testing output based on a testing input of the testing text prepended with the updated vector input.

* * * * *